(12) United States Patent
Mou et al.

(10) Patent No.: US 11,536,644 B2
(45) Date of Patent: Dec. 27, 2022

(54) GAS DETECTION DEVICE

(71) Applicant: Microjet Technology Co., Ltd., Hsinchu (TW)

(72) Inventors: Hao-Jan Mou, Hsinchu (TW); Ying-Lun Chang, Hsinchu (TW); Hsien-Chung Tai, Hsinchu (TW); Chin-Chuan Wu, Hsinchu (TW); Chi-Feng Huang, Hsinchu (TW); Yung-Lung Han, Hsinchu (TW); Chin-Wen Hsieh, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 99 days.

(21) Appl. No.: 17/330,769

(22) Filed: May 26, 2021

(65) Prior Publication Data

US 2021/0381947 A1 Dec. 9, 2021

(30) Foreign Application Priority Data

Jun. 3, 2020 (TW) .................................. 109118696

(51) Int. Cl.
*G01N 15/14* (2006.01)
*G01N 27/12* (2006.01)

(52) U.S. Cl.
CPC ....... *G01N 15/1429* (2013.01); *G01N 27/128* (2013.01)

(58) Field of Classification Search
CPC .. G01N 15/1429; G01N 27/128; G01N 15/06; G01N 15/0205; G01N 2015/0046; G01N 2015/0693
See application file for complete search history.

(56) References Cited

U.S. PATENT DOCUMENTS

2019/0212242 A1* 7/2019 Mou .................. G01N 33/0047

FOREIGN PATENT DOCUMENTS

| CN | 1707270 A | 12/2005 |
|---|---|---|
| TW | M567361 U | 9/2018 |
| TW | M567364 U | 9/2018 |

(Continued)

*Primary Examiner* — Roy M Punnoose
(74) *Attorney, Agent, or Firm* — Birch, Stewart, Kolasch & Birch, LLP (57) ABSTRACT

A gas detection device manufactured by a semiconductor process includes a substrate, a microelectromechanical element, a light-emitting element, a particle-sensing element, a gas-sensing element, a driving-chip element and an encapsulation layer. The driving-chip element controls driving operations of the microelectromechanical element, the light-emitting element, the particle-sensing element and the gas-sensing element, respectively. When the microelectromechanical element is enabled to actuate transportation of gas, the gas is introduced into the gas detection device through an inlet aperture of the substrate. Scattered light spots generated by the light beam of the light-emitting element irradiating on suspended particles contained in the gas are received by the particle-sensing element to generate a detection datum of the suspended particles. The gas-sensing element detects the gas passing through and generates a detection datum of hazardous gas contained in the gas. Finally, the gas is discharged from an outlet aperture of the encapsulation layer.

10 Claims, 7 Drawing Sheets

(56) References Cited

FOREIGN PATENT DOCUMENTS

| TW | M568360 U | 10/2018 |
| TW | 201911194 A | 3/2019 |
| TW | M582134 U | 8/2019 |
| TW | 202001215 A | 1/2020 |
| TW | 202001225 A | 1/2020 |
| TW | I686595 B | 3/2020 |
| TW | I692630 B | 5/2020 |

\* cited by examiner

GAS DETECTION DEVICE

FIELD OF THE INVENTION

The present disclosure relates to a gas detection device, and more particularly to a miniaturized gas detection device manufactured by a semiconductor process.

BACKGROUND OF THE INVENTION

In recent, people pay more and more attention to the air quality around their lives. For example, carbon monoxide, carbon dioxide, volatile organic compounds (VOC), PM2.5, nitric oxide, sulfur monoxide and even the suspended particles in the air exposed in the environment might affect the human health, and even endanger people's life seriously. Therefore, the air quality in the environment has attracted the attention in various countries. At present, how to detect the air quality and avoid the harmful effect result therefrom is a problem that needs to be solved urgently.

In order to confirm the quality of the air, it is feasible to use a gas sensor to detect the air surrounding in the environment. If the detection information can be provided in real time to warn the people in the environment, it would be very helpful of avoiding the harmful environment and facilitates people to escape therefrom immediately. Thus, it prevents the hazardous gas exposed in the environment from affecting the human health and causing the harmful effect. Therefore, using a gas sensor to detect the air in the surrounding environment is a very good application and is an important subject to be developed in the present disclosure.

SUMMARY OF THE INVENTION

An object of the present disclosure is to provide a gas detection device, which is a miniaturized structure manufactured by a semiconductor process, and capable of being applied to a portable device and a thin and small device, so as to provide the effect of real-time monitoring of air quality anytime and anywhere.

In accordance with an aspect of the present disclosure, a gas detection device is provided. The gas detection device includes a substrate, a microelectromechanical element, a light-emitting element, a particle-sensing element, a gas-sensing element, a driving-chip element and an encapsulation layer. The substrate includes a microelectromechanical-element region, a particle-sensing region, a gas-sensing region and a driving-element region, wherein at least one inlet aperture is formed in the microelectromechanical-element region by an etching process. The microelectromechanical element manufactured by a semiconductor process is stacked and integrally formed on the microelectromechanical-element region of the substrate, and corresponds to the at least one inlet aperture to actuate transportation of gas. The light-emitting element manufactured by a semiconductor process is stacked and integrally formed on the particle-sensing region of the substrate to emit a light beam. The particle-sensing element manufactured by a semiconductor process is stacked and integrally formed on the particle-sensing region of the substrate, and spaced apart from the light-emitting element, to receive scattered light spots generated by the light beam of the light-emitting element irradiating on the suspended particles, so as to achieve the detection of suspension particles in the gas. The gas-sensing element manufactured by a semiconductor process is stacked and integrally formed on the gas-sensing region, to detect the gas passing therethrough. The driving-chip element manufactured by a semiconductor process is stacked and integrally formed on the driving-element region. The driving-chip element is electrically connected to the microelectromechanical element, the light-emitting element, the particle-sensing element and the gas-sensing element, and includes a microprocessor. The encapsulation layer is encapsulated and positioned on the substrate, and forms a flowing-channel space above the microelectromechanical element, the light-emitting element and the gas-sensing element, and at least one outlet aperture and a light-admitting aperture are formed in the encapsulation layer by an etching process. The microprocessor of the driving-chip element controls driving operations of the microelectromechanical element, the light-emitting element, the particle-sensing element and the gas-sensing element, respectively, wherein the microelectromechanical element is enabled to actuate the transportation of the gas, the gas is introduced into the flowing-channel space through the at least one inlet aperture of the substrate, the scatted light spots are generated by the light beam of the light-emitting element irradiating on the suspended particles, the particle-sensing element receives the scatted light spots to obtain a detection datum of the suspended particles, the gas-sensing element detects the gas passing therethrough to obtain a detection datum of hazardous gas, and finally the gas is discharged through the outlet aperture of the encapsulation layer.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
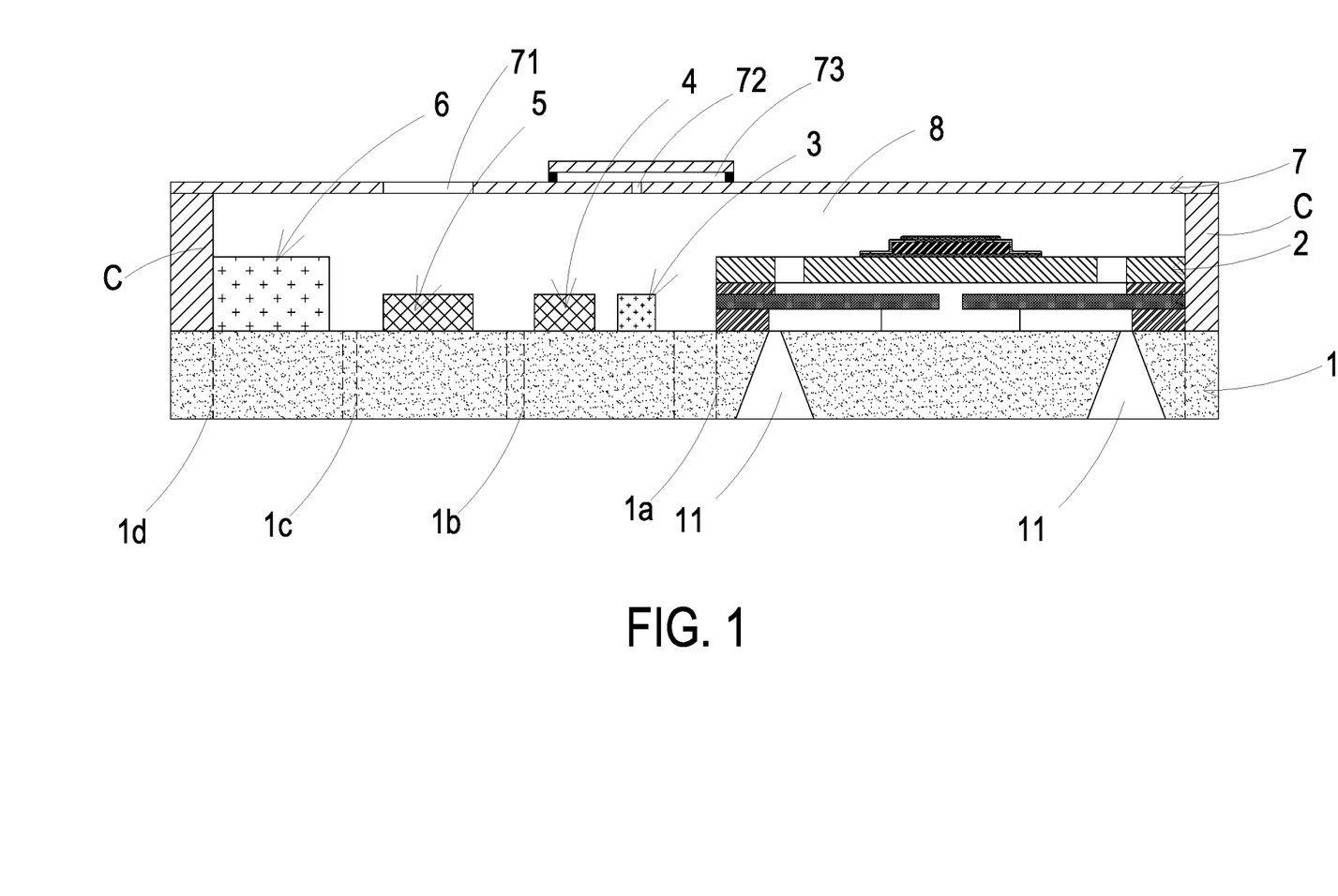
FIG. 1 shows a cross sectional view illustrating a gas detection device according to an embodiment of the present disclosure.

Please refer to FIG. 1. The present disclosure provides a gas detection device manufactured by a semiconductor process and included a substrate 1, a microelectromechanical element 2, a light-emitting element 3, a particle-sensing element 4, a gas-sensing element 5, a driving-chip element 6 and an encapsulation layer 7.

Preferably but not exclusively, the substrate 1 is a silicon substrate includes a microelectromechanical-element region 1a, a particle-sensing region 1b, a gas-sensing region 1c and a driving-element region 1d, wherein at least one inlet aperture 11 is formed in the microelectromechanical-element region 1a by an etching process.

Figure 2A:
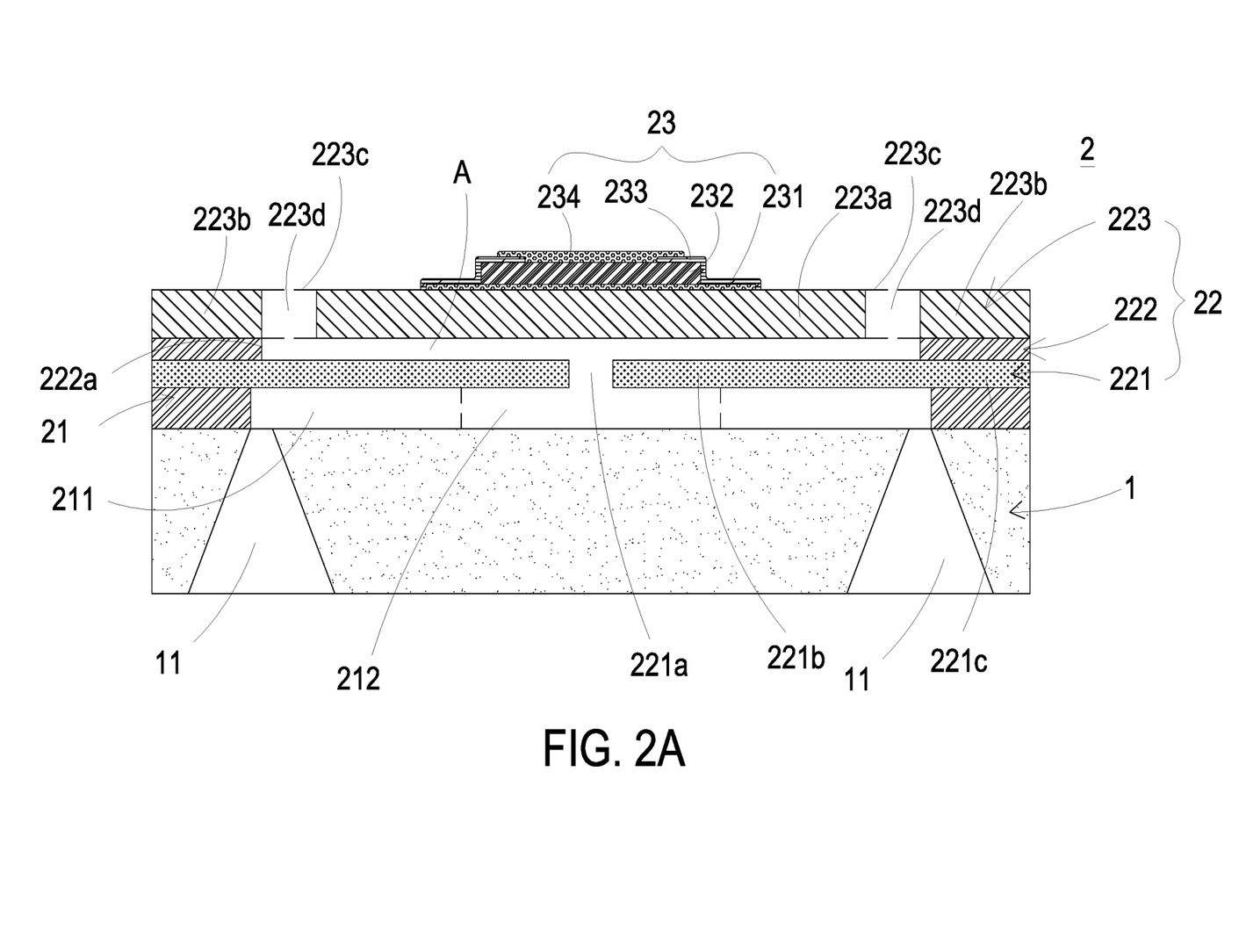
FIG. 2A shows a cross sectional view illustrating the microelectromechanical element of the gas detection device according to the embodiment of the present disclosure.
Figure 2B:
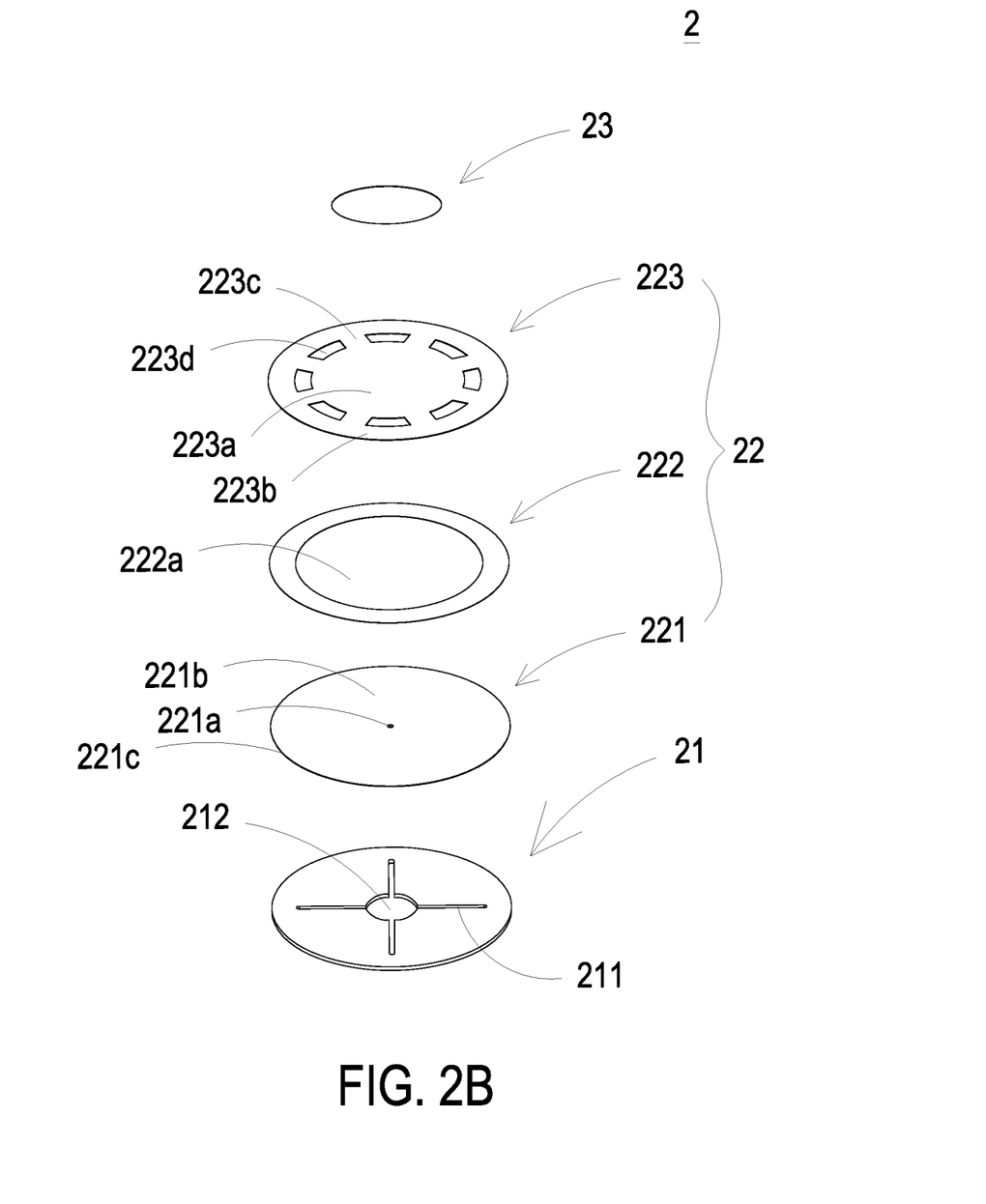
FIG. 2B is a schematic exploded view illustrating the microelectromechanical element of the gas detection device according to the embodiment of the present disclosure.

Please refer to FIGS. 2A and 2B. In the embodiment, the microelectromechanical element 2 manufactured by a semiconductor process is stacked and integrally formed on the microelectromechanical-element region 1a of the substrate 1, and corresponds to the at least one inlet aperture 11 of the substrate 1 to actuate transportation of gas, so that the gas is inhaled through the inlet aperture 11. In the embodiment, the microelectromechanical element 2 includes an oxidation layer 21, a vibration layer 22 and a piezoelectric component 23.

In the embodiment, the oxidation layer 21 is formed and stacked on the microelectromechanical-element region 1a of the substrate 1 by a deposition process. Moreover, the oxidation layer 21 includes a plurality of convergence channels 211 and a convergence chamber 212, which are formed by an etching process. In the embodiment, the plurality of convergence channels 211 are in fluid communication between the convergence chamber 212 and the at least one inlet aperture 11 of the substrate 1. Preferably but not exclusively, the deposition process is one selected from the group consisting of a physical vapor deposition process (PVD), a chemical vapor deposition process (CVD) and a combination thereof. The detail of the deposition process is not redundantly described hereafter.

In the embodiment, the vibration layer 22 is formed and stacked on the oxidation layer 21 by a deposition process, and includes a metal layer 221, a second oxidation layer 222 and a silicon chip layer 223. The metal layer 221 is formed and stacked on the oxidation layer 21 by a deposition process and includes a through hole 221a, a vibration portion 221b and a fixed portion 221c formed by an etching process. Preferably but not exclusively, the etching process is one selected from the group consisting of a wet etching process, a dry etching process and a combination thereof. The detail of the etching process is not redundantly described hereafter.

In the embodiment, the through hole 221a is manufactured by the etching process and formed at a center of the metal layer 221. The vibration portion 221b is disposed around a peripheral region of the through hole 221a. The fixed portion 221c is disposed around a peripheral region of the metal layer 221.

In the embodiment, the second oxidation layer 222 is formed and stacked on the metal layer 221 by a deposition process, and includes a hollow aperture 222a formed by an etching process.

In the embodiment, the silicon chip layer 223 is formed and stacked on the second oxidation layer 222 by a deposition process and includes an actuating portion 223a, an outer peripheral portion 223b, a plurality of connecting portions 223c and a plurality of fluid channels 223d, which are formed by an etching process. In the embodiment, the actuating portion 223a is disposed at a central part of the silicon chip layer 223. The outer peripheral portion 223b is disposed around an outer periphery of the actuating portion 223a. The plurality of connecting portions 223c are connected between the actuating portion 223a and the outer peripheral portion 223b, respectively, and each of the plurality of fluid channels 223d is disposed between the actuating portion 223a and the outer peripheral portion 223b and located between the plurality of connecting portions 223c. Furthermore, a compression chamber A is collaboratively defined by the silicon chip layer 223 and the hollow aperture 222a of the second oxidation layer 222.

In the embodiment, the piezoelectric component 23 is stacked on the actuating portion 223a of the silicon chip layer 223, and includes a lower electrode layer 231, a piezoelectric layer 232, an insulation layer 233 and an upper electrode layer 234. The lower electrode layer 231 is formed and stacked on the actuating portion 223a of the silicon chip layer 223 by a deposition process. The piezoelectric layer 232 is formed and stacked on the lower electrode layer 231 by a deposition process. The insulation layer 233 is formed and stacked on a partial surface of the piezoelectric layer 232 and a partial surface of the lower electrode layer 231 by a deposition process. The upper electrode layer 234 is formed and stacked on the insulation layer 233 and a remaining surface of the piezoelectric layer 232 without the insulation layer 233 disposed thereon by a deposition process, so as to electrically connect with piezoelectric layer 232.

Figure 3A:
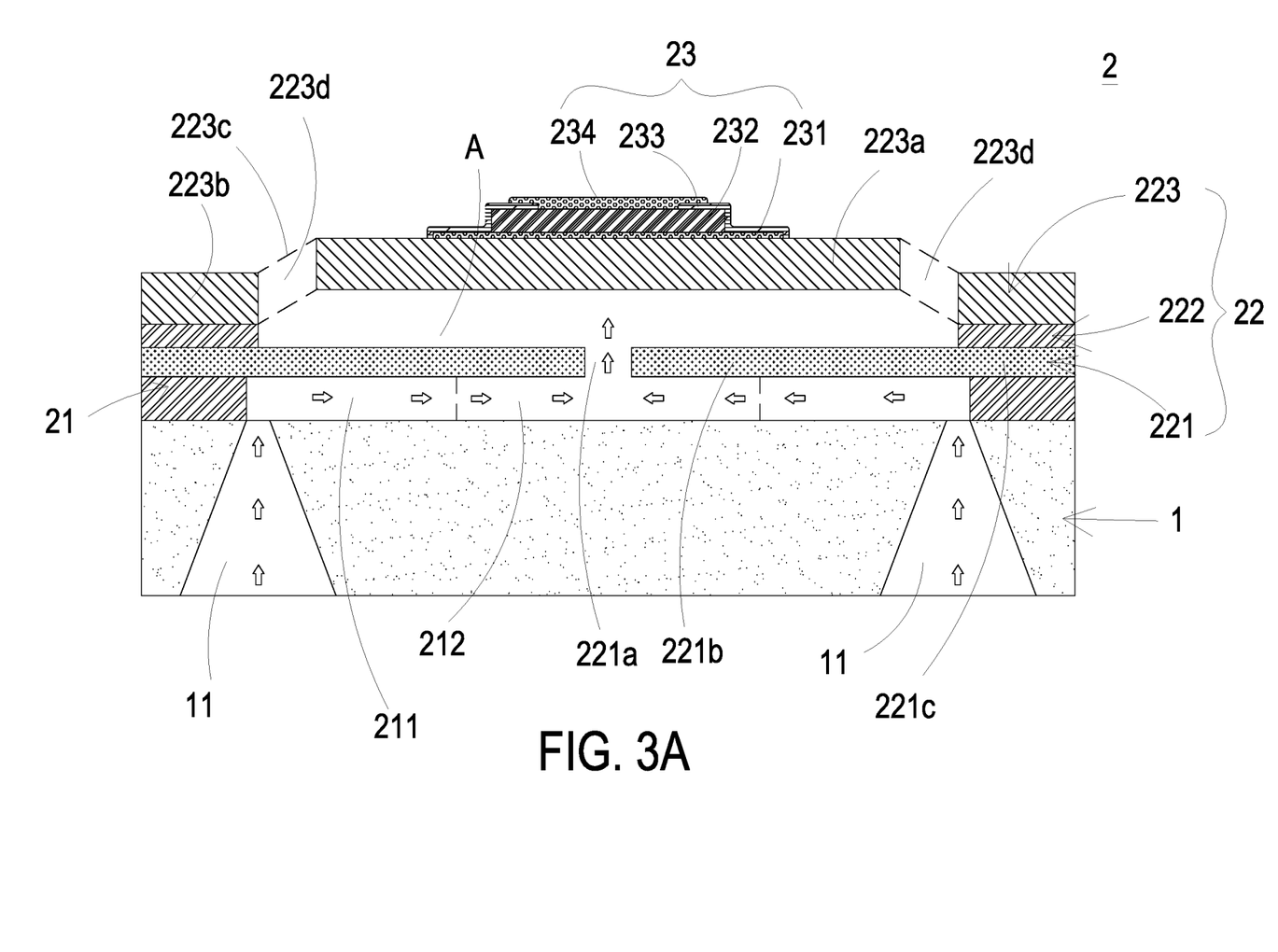
FIGS. 3A to 3C schematically illustrate the actions of the microelectromechanical element of the gas detection device according to the embodiment of the present disclosure.
Figure 3B:
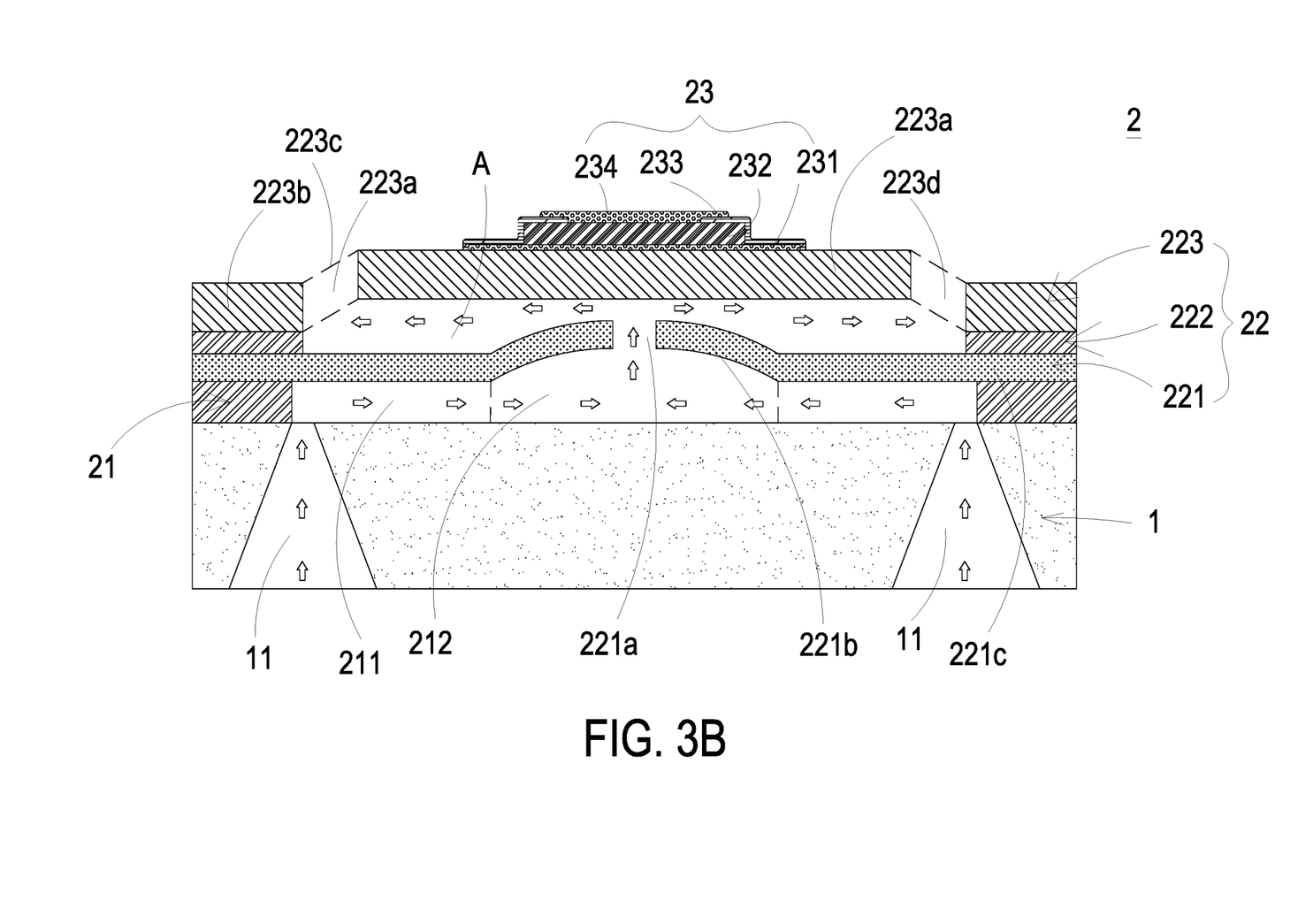
Figure 3C:
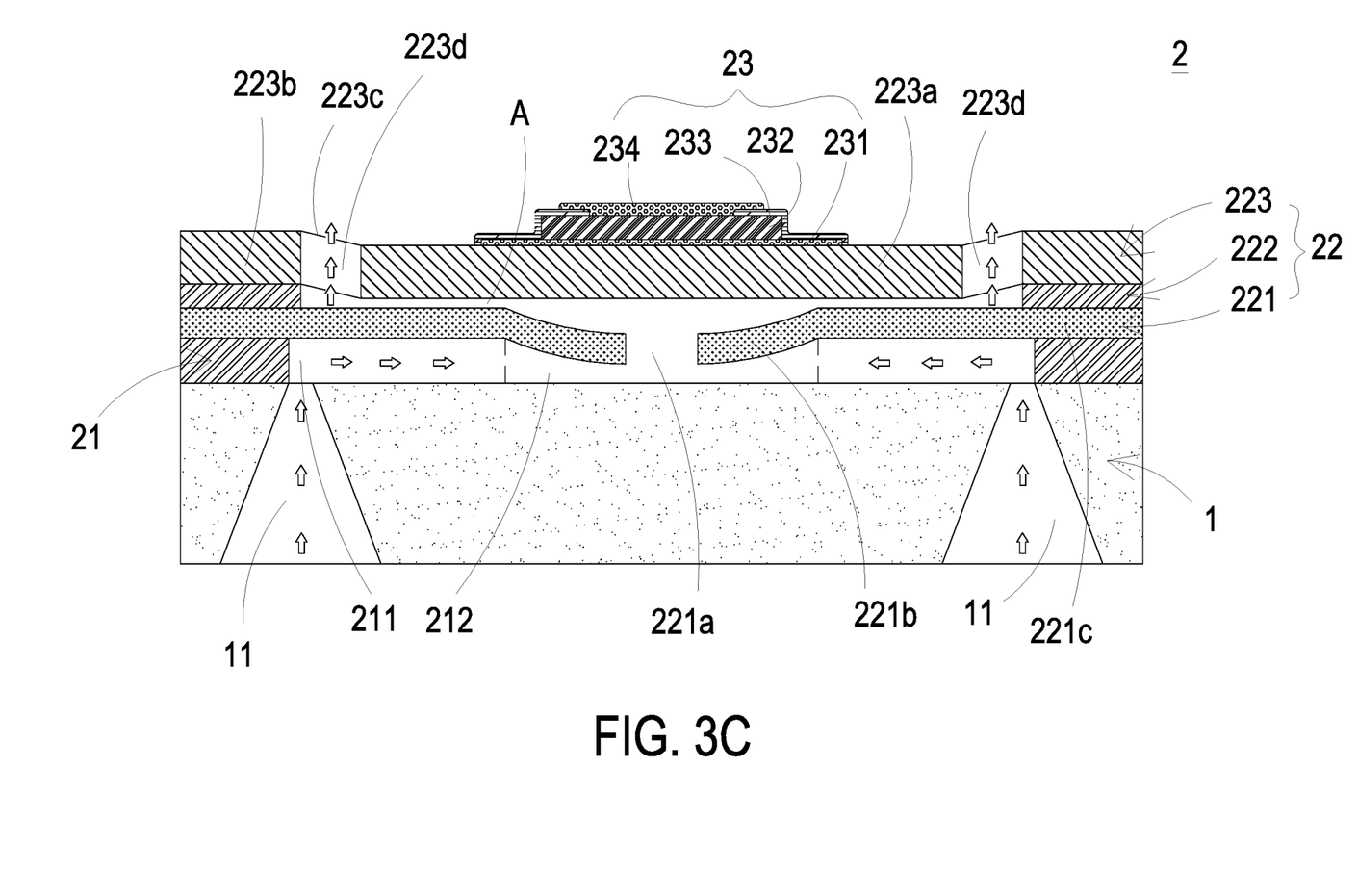

Please refer to FIGS. 3A to 3C which illustrate the actions of the microelectromechanical element. As shown in FIG. 3A, when a driving signal (not shown) is received by the lower electrode layer 231 and the upper electrode layer 234 of the piezoelectric component 23, piezoelectric layer 232 is deformation under the influence of the reverse piezoelectric effect, and drives the actuating portion 223a to move upwardly, thereby the actuating portion 223a is separated away from the second oxidation layer 222 to increase the distance therebetween. At this time, the volume of the compression chamber A is expended rapidly, the internal pressure of the compression chamber A is decreased to form a negative pressure, and the gas outside the substrate 1 is inhaled through the inlet aperture 11 and further transported into the plurality of convergence channels 211 and the convergence chamber 212. Please refer to FIG. 3B. When the actuating portion 223a is driven by the piezoelectric component 23 to move upwardly, the vibration portion 221b of the metal layer 221 is moved upwardly under the influence of the resonance principle. When the vibration portion 221b is displaced upwardly, the space of the compression chamber A is compressed and the gas therein is pushed to move to the fluid channels 223d of the silicon chip layer 223. Please refer to FIG. 3C. When the piezoelectric component 23 is enabled to drive the actuating portion 223a of the silicon chip layer 223 to displace downwardly, the vibration portion 221b of the metal layer 221 is driven by the actuating portion 223a to displace downwardly. In that, the gas is transported upwardly through the fluid channels 223d, and the gas in the convergence chamber 212 is compressed to flow to the compression chamber A through the through hole 221a at the same time. Thereafter, when the piezoelectric component 23 drives the actuating portion 223a to displace upwardly, the volume of the compression chamber A is greatly increased, and then a higher suction force is generated to inhale the gas into the compression chamber A. By repeating the actions shown in FIGS. 3A to 3C, the actuating portion 223a is continuously driven by the piezoelectric element 23 to displace upwardly and downwardly, and further to drive the vibration portion 221b to displace upwardly and downwardly. Through changing the internal pressure of the compression chamber A of the microelectromechanical element 2, the gas is inhaled and discharged continuously and, thus, achieved the operation of gas transportation of the microelectromechanical element 2

Figure 4:
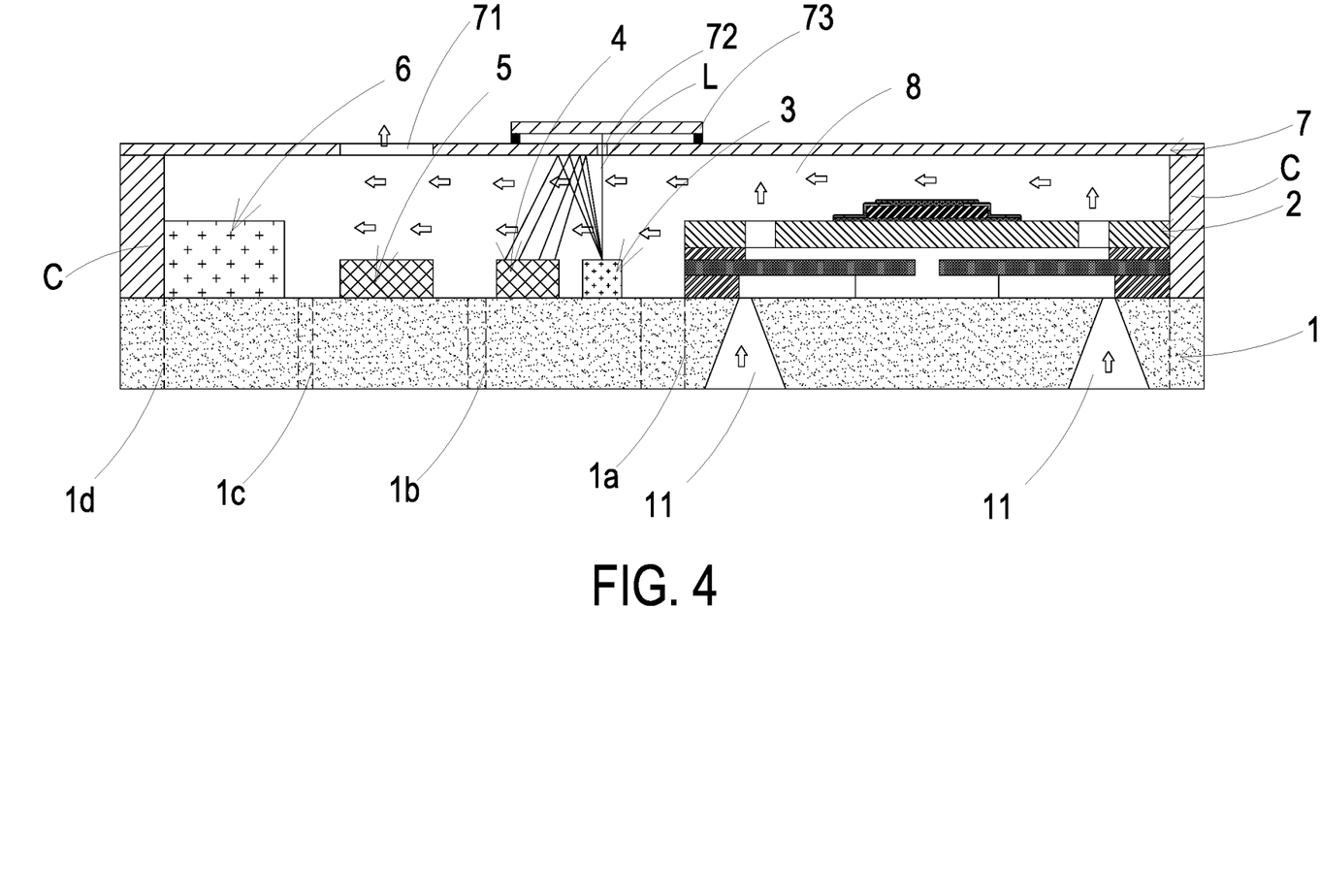
FIG. 4 schematically illustrates the action of the gas detection device according to the embodiment of the present disclosure.

Please refer to FIG. 1 and FIG. 4. In the embodiment, the light-emitting element 3 manufactured by a semiconductor process is stacked and integrally formed on the particle-sensing region 1b of the substrate 1 to emit a light beam L.

In the embodiment, the particle-sensing element 4 manufactured by a semiconductor process is stacked and integrally formed on the particle-sensing region 1b of the substrate 1, and spaced apart from the light-emitting element 3, to receive scattered light spots generated by the light beam L of the light-emitting element 3 irradiating on the suspension particle in the gas, so as to achieve a detection of suspended particles and obtain a detection datum. Preferably but not exclusively, the detection datum generated by the particle-sensing element 4 is a detection datum of the suspended particles. In the embodiment, the suspended particles are one selected from the group consisting of PM 10, PM 2.5 and PM 1. In the embodiment, the gas-sensing element 5 manufactured by a semiconductor process is stacked and integrally formed on the gas-sensing element 1c of the substrate 1, to detect the gas passing therethrough and obtain a detection datum. Preferably but not exclusively, the detection datum generated by the gas-sensing element 5 is a detection datum of hazardous gas. In the embodiment, the hazardous gas is one selected from the group consisting of formaldehyde, ammonia, carbon monoxide, carbon dioxide, oxygen and ozone. In other embodiments, the detection datum generated by the gas-sensing element 5 is a detection datum of virus contained in the gas, but not limited thereto. In the embodiment, the driving-chip element 6 manufactured by a semiconductor process includes a microprocessor (not shown), a battery (not shown) and a communicator (not shown). The driving-chip element 6 is stacked and integrally formed on the driving-element region 1d of the substrate 1, and allows the microelectromechanical element 2, the light-emitting element 3, the particle-sensing element 4 and the gas-sensing element 5 to be connected thereto. In that, the microprocessor of the driving-chip-element 6 controls the driving of the microelectromechanical element 2, the light-emitting element 3, the particle-sensing element 4 and the gas-sensing element 5, respectively. Moreover, the microprocessor of the driving-chip element 6 receives the detection datum of the suspended particles detected by the particle-sensing element 4 and the detection datum of the hazardous gas detected by the gas-sensing element 5 to calculate and output detection information about the suspended particles and the hazardous gas. The battery of the driving-chip element 6 provides a power for operations of the gas detection device. The communicator of the driving-chip element 6 receives the detection information outputted by the microprocessor, and the detection information is externally transmitted to an external device (not shown). Preferably but not exclusively, the communicator of the driving-chip element 6 is connected to the external device via a wireless communication transmission, so that the external device receives the detection information to issue a notification.

Please refer to FIGS. 1 and 4. In the embodiment, the encapsulation layer 7 is encapsulated and positioned on the substrate 1, preferably but not exclusively, through a dry film C to combine with, position and cover above the microelectromechanical element 2, the light-emitting element 3, the particle-sensing element 4 and the gas-sensing element 5, and form a flowing-channel space 8 above the microelectromechanical element 2, the light-emitting element 3, the particle-sensing element 4 and the gas-sensing element 5. Moreover, at least one outlet aperture 71 and a light-admitting aperture 72 are formed in the encapsulation layer 7 by an etching process. In the embodiment, there is one outlet aperture 71, but not limited thereto. In the embodiment, the light-admitting aperture 72 of the encapsulation layer 7 allows the light beam L emitted by the light-emitting element 3 to pass through. Additionally, a mask 73 covers above the light-admitting aperture 72 to shade the light beam L emitted by the light-emitting element 3, so a s to prevent the light beam L from direct reflection and affecting the detection accuracy of the particle-sensing element 4. The scattered light spots generated by the light beam L of the light-emitting element 3 indirectly scattered by the encapsulation layer 7 and passed through the gas, and then received and detected by the particle-sensing element 4 to detect the suspended particles contained in the gas.

As described above and shown in FIG. 4, the gas detection device of the present disclosure controls the driving operations of the microelectromechanical element 2, the light-emitting element 3, the particle-sensing element 4 and the gas-sensing element 5 through the driving-chip element 6. When the microelectromechanical element 2 is enabled to actuate transportation of the gas, the gas is introduced into the flowing-channel space 8 through the inlet aperture 11, and then discharged through the outlet aperture 71 of the encapsulation layer 7. At this time, the scattered light spots generated by the light beam L of the light-emitting element 3 are indirectly scattered by the encapsulation layer 7 and passed through the gas, and then received and detected by the particle-sensing element 4 to detect and generated a detection datum of the suspended particles. The detection datum generated by the particle-sensing element 4 is provided to the microprocessor of the driving-chip element 6 to calculate and output detection information regarding to particle size and concentration of the suspended particles. Furthermore, the gas-sensing element 5 detects the gas passing therethrough to obtain the detection datum of hazardous gas, and the detection datum generated thereby is provided to the microprocessor of the driving-chip element 6 to calculate and output detection information regarding to the detection datum of the hazardous gas. The detection information regarding to the detection datum of the suspension particles and the hazardous gas is received by the communicator of the driving-chip element 6 and externally transmitted to the external device, so as to allow the external device to issue a notification based on the received detection information.

In summary, the present disclosure provides a gas detection device, which is a miniaturized structure manufactured by a semiconductor process, and capable of being applied to a portable device and a thin and small device, so as to provide the effect of real-time monitoring of air quality anytime and anywhere.

While the disclosure has been described in terms of the most practical and preferred embodiments, it is to be understood that the disclosure needs not be limited to the disclosed embodiments. On the contrary, it is intended to cover various modifications and similar arrangements included within the spirit and scope of the appended claims so as to encompass all such modifications and similar structures.

What is claimed is:
1. A gas detection device, comprising:
a substrate comprising a microelectromechanical-element region, a particle-sensing region, a gas-sensing region and a driving-element region, wherein at least one inlet aperture is formed in the microelectromechanical-element region by an etching process;
a microelectromechanical element, manufactured by a semiconductor process, stacked and integrally formed on the microelectromechanical-element region of the substrate, and corresponding to the at least one inlet aperture to actuate transportation of gas;

a light-emitting element, manufactured by a semiconductor process, and stacked and integrally formed on the particle-sensing region of the substrate to emit a light beam;

a particle-sensing element, manufactured by a semiconductor process, stacked and integrally formed on the particle-sensing region of the substrate, and spaced apart from the light-emitting element, so as to receive scattered light spots generated by the light beam of the light-emitting element irradiating on the gas to achieve a detection of suspended particles;

a gas-sensing element, manufactured by a semiconductor process, stacked and integrally formed on the gas-sensing region to detect the gas passing therethrough;

a driving-chip element, manufactured by a semiconductor process, stacked and integrally formed on the driving-element region, wherein the driving-chip element is electrically connected to the microelectromechanical element, the light-emitting element, the particle-sensing element and the gas-sensing element, and comprises a microprocessor; and an encapsulation layer encapsulated and positioned on the substrate, wherein a flowing-channel space is formed above the microelectromechanical element, the light-emitting element and the gas-sensing element, and at least one outlet aperture and a light-admitting aperture are formed in the encapsulation layer by an etching process;

wherein the microprocessor of the driving-chip element controls driving operations of the microelectromechanical element, the light-emitting element, the particle-sensing element and the gas-sensing element, respectively, wherein the microelectromechanical element is enabled to actuate the transportation of the gas, the gas is introduced into the flowing-channel space through the at least one inlet aperture of the substrate, the scatted light spots are generated by the light beam of the light-emitting element irradiating on the suspended particles, the particle-sensing element receives the scatted light spots to obtain a detection datum of the suspended particles, the gas-sensing element detects the gas passing therethrough to obtain a detection datum of hazardous gas, and finally the gas is discharged through the outlet aperture of the encapsulation layer.

2. The gas detection device according to claim 1, wherein the microelectromechanical element comprises:

an oxidation layer formed and stacked on the microelectromechanical-element region of the substrate by a deposition process, wherein the oxidation layer comprises a plurality of convergence channels and a convergence chamber formed by an etching process, and the plurality of convergence channels are in fluid communication between the convergence chamber and the at least one inlet aperture of the substrate;

a vibration layer formed and stacked on the oxidation layer by a deposition process, and comprising:

a metal layer formed and stacked on the oxidation layer by a deposition process and comprising a through hole, a vibration portion and a fixed portion formed by an etching process, wherein the through hole is formed at a center of the metal layer, the vibration portion is disposed around a peripheral region of the through hole, and the fixed portion is disposed around a peripheral region of the metal layer;

a second oxidation layer formed and stacked on the metal layer by a deposition process, and comprising a hollow aperture formed by an etching process; and a silicon chip layer formed and stacked on the second oxidation layer by a deposition process and comprising an actuating portion, an outer peripheral portion, a plurality of connecting portions and a plurality of fluid channels formed by an etching process, wherein the actuating portion is disposed at a central part of the silicon chip layer, the outer peripheral portion is disposed around an outer periphery of the actuating portion, the plurality of connecting portions are connected between the actuating portion and the outer peripheral portion, respectively, and each of the plurality of fluid channels is disposed between the actuating portion and the outer peripheral portion and located between the plurality of connecting portions, wherein a compression chamber is collaboratively defined by the silicon chip layer and the hollow aperture of the second oxidation layer; and a piezoelectric component stacked on the actuating portion of the silicon chip layer, and comprising a lower electrode layer, a piezoelectric layer, an insulation layer and an upper electrode layer, wherein the piezoelectric layer is formed and stacked on the lower electrode layer by a deposition process, the insulation layer is formed and stacked on a partial surface of the piezoelectric layer and a partial surface of the lower electrode layer by a deposition process, and the upper electrode layer is formed and stacked on the insulation layer and a remaining surface of the piezoelectric layer without the insulation layer disposed thereon by a deposition process, so as to electrically connect with piezoelectric layer.

3. The gas detection device according to claim 1, wherein the driving-chip element comprises a battery to provide a power for operations of the gas detection device.

4. The gas detection device according to claim 1, wherein the microprocessor of the driving-chip element receives the detection datum of the suspended particles detected by the particle-sensing element and the detection datum of the hazardous gas detected by the gas-sensing element to calculate and output detection information regarding to the detection datum of suspended particles and the detection datum of the hazardous gas, wherein the microprocessor comprises a communicator, and the detection information regarding to detection datum of the suspended particles and the detection datum of the hazardous gas is received by the communicator and externally transmitted to an external device, so as to allow the external device to issue a notification based on the received detection information.

5. The gas detection device according to claim 4, wherein the communicator is connected to the external device via a wireless communication transmission.

6. The gas detection device according to claim 1, wherein the suspended particles are one selected from the group consisting of PM 10, PM 2.5 and PM 1.

7. The gas detection device according to claim 1, wherein the hazardous gas is one selected from the group consisting of formaldehyde, ammonia, carbon monoxide, carbon dioxide, oxygen and ozone.

8. The gas detection device according to claim 1, wherein the detection datum of the hazardous gas is a detection datum of virus contained in the gas.

9. The gas detection device according to claim 1, wherein the light-admitting aperture of the encapsulation layer allows the light beam emitted by the light-emitting element to pass through, and the encapsulation layer is covered by a mask above the light-admitting aperture to shade the light beam emitted by the light-emitting element.

10. The gas detection device according to claim 1, wherein the encapsulation layer is coated on the substrate through a dry film to combine with, position and cover above the microelectromechanical element, the light-emitting element, the particle-sensing element and the gas-sensing element.

* * * * *